C. NORDSTROM & F. H. SCHWAIBOLD.
LATHE TAPER ATTACHMENT.
APPLICATION FILED SEPT. 29, 1913.
1,168,326.
Patented Jan. 18, 1916.
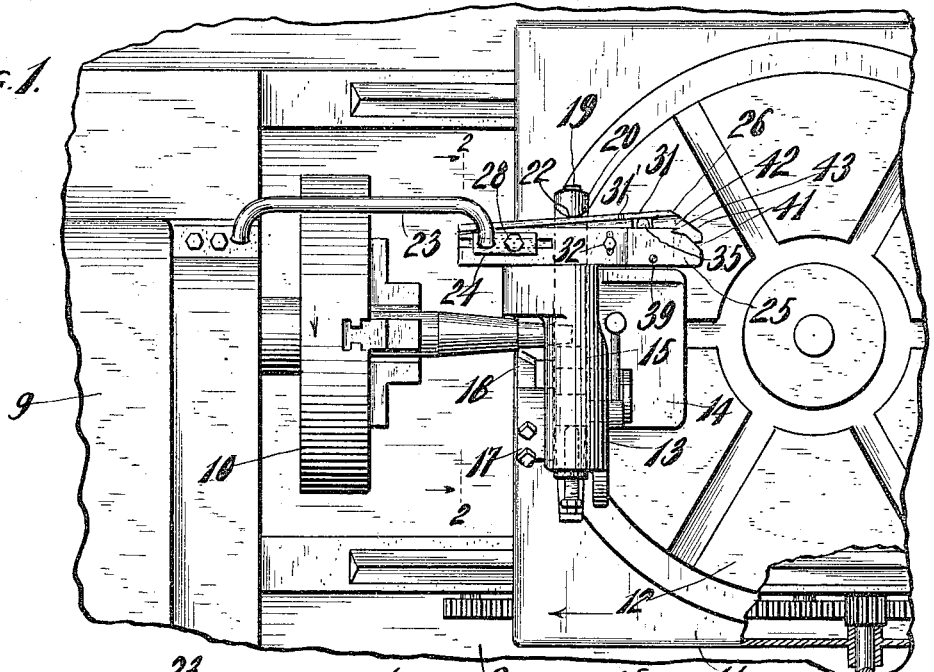
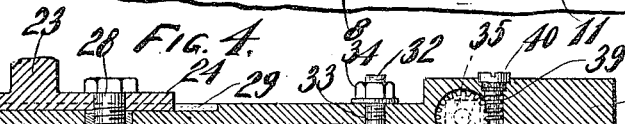
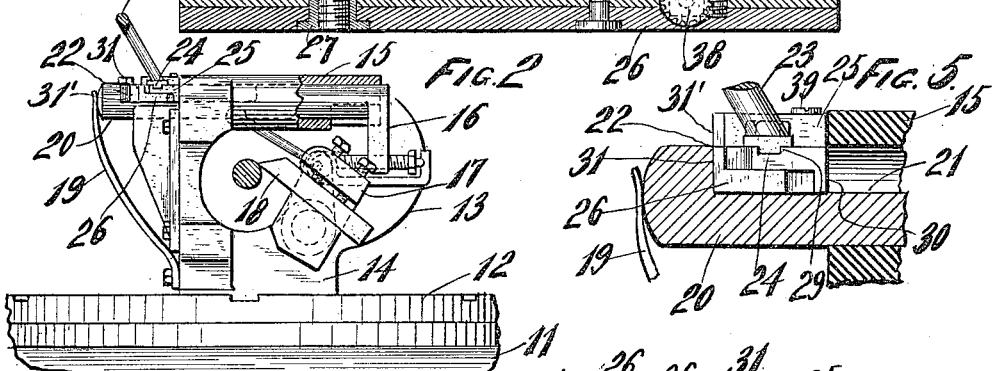
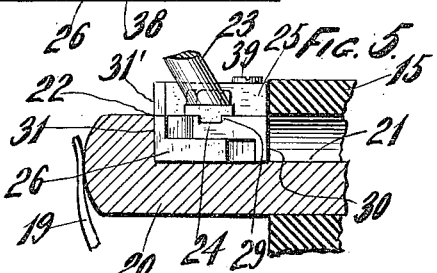
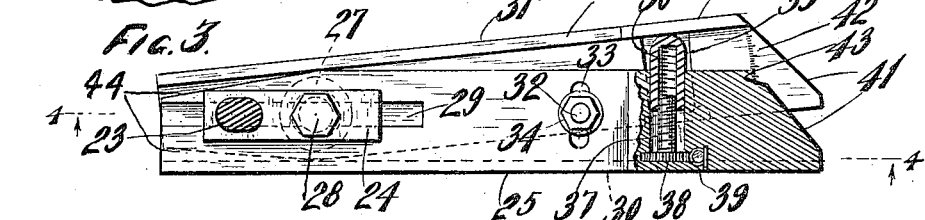
WITNESSES.
INVENTOR.
Charles Nordstrom & Freddie H. Schwaibold
By Morsell & Caldwell
ATTORNEYS.
THE COLUMBIA PLANOGRAPH CO., WASHINGTON, D. C.

UNITED STATES PATENT OFFICE.

CHARLES NORDSTROM AND FREDERICK H. SCHWAIBOLD, OF MILWAUKEE, WISCONSIN.

LATHE TAPER ATTACHMENT.

1,168,326.  Specification of Letters Patent.  Patented Jan. 18, 1916.

Application filed September 29, 1913. Serial No. 792,264.

*To all whom it may concern:*

Be it known that we, CHARLES NORDSTROM and FREDERICK H. SCHWAIBOLD, citizens of the United States, and residents of Milwaukee, in the county of Milwaukee and State of Wisconsin, have invented new and useful Improvements in Lathe Taper Attachments, of which the following is a description, reference being had to the accompanying drawings, which are a part of this specification.

This invention relates to improvements in lathe taper attachments more particularly adapted for use with turret lathes.

It is one of the objects of the present invention to provide a lathe taper attachment with which tapers of different angles may be easily cut on a turret lathe without the necessity of using guides of different angles.

A further object of the invention is to provide a lathe taper attachment of the adjustable type which may be easily connected to the arms ordinarily provided for holding non-adjustable taper attachments.

A further object of the invention is to provide a lathe taper attachment which may be easily adjusted to serve as a guide for cutting tapers of any angles desired.

A further object of the invention is to provide a lathe taper attachment with means for indicating the different angles the attachment may be adjusted to serve as a guide for.

A further object of the invention is to provide a lathe taper attachment for use in connection with the usual turret lathe tool holder.

With the above and other objects in view the invention consists of the improved lathe taper attachment and its parts and combinations as set forth in the claims, and all equivalents thereof.

In the accompanying drawing in which the same reference characters indicate the same parts in all of the views: Figure 1 is a top view of a portion of a turret lathe provided with the improved taper attachment, the view also illustrating the operation of cutting a piece of material into taper form; Fig. 2 is a transverse sectional view thereof taken on line 2—2 of Fig. 1; Fig. 3 is a top view, on a larger scale, of the improved taper attachment, portions being broken away to show interior construction; Fig. 4 is a vertical longitudinal sectional view thereof taken approximately on line 4—4 of Fig. 3; and Fig. 5 is a rear end view of the attachment and a portion of the tool bracket and holder.

Referring to the drawing the numeral 8 indicates the frame of an ordinary turret lathe, 9 the headstock, 10 the chuck revolubly mounted thereon, 11 the carriage slidably mounted on the frame, 12 the revoluble table or turret and 13 the usual tool bracket attachment mounted thereon. The tool bracket comprises the frame 14 provided with the horizontally extending tubular portion 15 in which is slidably mounted the angular tool holder actuating member 16, having an adjustable connection with a tool clamping member 17 which is slidably mounted on the tool bracket 13. The member 17 holds the cutting tool 18 and a spring 19 yieldingly holds the recessed end of the tool holder actuating member in its innermost position. The horizontally extending portion 20 of the tool holder member 16 is of cylindrical form and projects outwardly through the tool bracket and is provided with an upper recess 21 to form a rounded upstanding shoulder 22 on its outer end. The parts thus far described are of ordinary construction and common to modern turret lathes. The improved taper attachment is adapted to be placed in the recess 21 and between the shoulder 22 and the side of the tool bracket and is held in position by means of a holding arm 23 also of ordinary construction and which is usually furnished as an attachment for turret lathes. The holding arm is bolted to the head of the lathe and is curved to clear the chuck and the work and at its outer end is provided with a rectangular portion 24 to which the taper attachment is bolted.

The taper attachment comprises two angular members 25 and 26 which overlap each other and are pivotally connected together by a pivot sleeve 27, the bore of which is threaded to receive a bolt 28. The bolt extends through the rectangular portion of the holding arm and firmly clamps the said attachment to the arm. An elongated recess 29 provided in the upper portion of the member 25 and into which the rectangular portion 24 extends and snugly fits serves to hold the attachment in proper alinement with the path of movement of the lathe carriage.

The overlapped members 25 and 26 are L-shaped in cross section and the downwardly extending flange 30 of the upper member 25 projects in front of the inner edge of the lower member 26 and the upstanding flange 31 of the lower member 26 projects in front of the outer edge of the upper member 25. The upper member 25 is adapted to abut against the outer side edge of the tool bracket while the lower member 26 is adapted to be adjusted to different angles with relation to the upper member to guide the tool holder member 16 along its outer edge 31' in cutting the tapers on the work.

The angularity of the lower member with reference to the upper member is maintained by means of a clamping bolt 32 which is secured to the lower member and extends upwardly through an elongated slot 33 in the upper member and is provided with a nut 34 for clamping the two members together in adjusted positions. The slot is formed on an arc concentric with the pivot sleeve 28 of the members to permit the arc of movement desired.

In order to provide for very fine adjustments of the members a slidable sleeve 35 transversely mounted in the outer free end of the upper member is provided which is adapted to bear against the inner face of the upstanding flange 31. The sleeve is rectangular in cross section to prevent turning and is provided with a threaded bore 36 to receive the threaded bolt 37 of the worm wheel 38 which is revolubly mounted in the member 25. A worm member 39 vertically mounted in the member 25 meshes with the worm wheel and its upper end is provided with a screw head 40 for convenience in turning the said member.

The forward free ends of the attachment members are beveled as indicated by the numeral 41 to permit the shoulder 22 of the tool holder to ride easily thereupon when disengaged therefrom. The upper face of the lower member or any other part desired is provided with a scale 42 which co-acts with the point 43 to indicate the angularity of the different positions of the members.

The rearward ends of the attachment members are beveled as indicated by the numeral 44 to permit the flanges 30 and 31 adjacent said beveled portions to fulcrum on the point of intersection between the beveled and horizontal-extending sides of the members.

In use the taper attachment is placed in the position shown in Fig. 1 with the tool holder shoulder engaging the attachment and the cutting tool engaging the work. Now as the work is rotated and the carriage is traversing the lathe frame the toolholder member shoulder will follow the angle of the attachment and the tool will be guided thereby and cut the work with a corresponding taper.

From the foregoing description it will be seen that the taper attachment is of very simple construction and is well adapted to perform the functions desired.

What we claim as our invention is:

1. A lathe taper attachment, comprising a pair of overlapping co-acting members L-shaped in cross section, the flanges of each member extending in front of the side edge of the other member, means pivotally connecting the members together near their end portions, a slidable member mounted on one of the members and abutting against the flange of the other member, a worm wheel having a threaded bolt threaded into the slidable member, a worm member for revolving the worm wheel, means for locking the two members in adjusted positions, and means for attaching one of the members to a support.

2. A lathe taper attachment, comprising a pair of overlapping co-acting members L-shaped in cross section, the flanges of each member extending in front of the side edge of the other member, a threaded sleeve pivotally connecting the members together near their end portions, a bolt threaded into the sleeve for securing the members to a support, a slidable member mounted on one of the members and abutting against the flange of the other member, a worm wheel mounted in one of the members and having a projecting bolt which has a threaded engagement with the slidable member, a worm member in mesh with the worm for adjusting the angularity of the members, and a bolt and elongated slot connection between both members for locking the members in adjusted positions.

3. The combination, with a turret-lathe tool holder comprising a bracket and a tool holder actuating member slidably mounted in said bracket, of a taper attachment for guiding said actuating member comprising a plurality of members slidably engaging said actuating member, one of said members engaging said bracket, means for adjusting said taper attachment members with respect to each other to guide the tool for a taper cut, and means for attaching said attachment to a support.

4. The combination, with a turret-lathe tool holder comprising a bracket and a tool holder actuating member slidably mounted in said bracket, of a taper attachment for guiding said actuating member comprising a pair of members, one of said members having a bearing engagement with said actuating member, the other of said members having bearing engagement with said bracket, means for adjusting said taper attachment members with respect to each other to guide the tool for a taper cut and means for attaching said attachment to a support.

5. The combination with a turret-lathe tool holder comprising a bracket and a tool holder actuating member slidably mounted in said bracket and having a recess therein, of a taper attachment comprising a pair of co-acting members pivotally connected together and disposed within the recess in the actuating member between the bracket and said actuating member, means for moving one of said members with respect to the other to vary the angularity between said members, said members forming a guide for the tool actuating member and means for attaching said attachment to a support.

6. The combination, with a turret-lathe tool holder comprising a bracket and a tool actuating member having a recess therein and slidably mounted in said bracket, of a taper attachment comprising means for insertion in said recess between the bracket and the portion of the tool holder adjacent said recess for guiding said actuating member to make the taper cut, said means comprising a pair of coacting members operatively connected together, means for adjusting the angularity of one of said members with respect to the other, and means for attaching said attachment to a support.

7. The combination, with a turret-lathe tool holder comprising a bracket and a tool actuating member having a recess therein and slidably mounted in said bracket, of a taper attachment comprising a pair of co-acting members pivotally connected together and removably disposed in said recess between the bracket and the portion of the tool holder adjacent said recess for guiding said actuating member to make the taper cut, the outer side of one of said members bearing upon the portion of the actuating member adjacent the recess, the outer side of the other of said members bearing upon said bracket, means for adjusting the angularity of said members with respect to each other, and means for attaching one of said members to a support.

In testimony whereof, we affix our signatures, in presence of two witnesses.

CHARLES NORDSTROM.
FREDDIE H. SCHWAIBOLD.

Witnesses:
C. H. KEENEY,
KATHERINE HOLT.

Copies of this patent may be obtained for five cents each, by addressing the "Commissioner of Patents, Washington, D. C."